Nov. 6, 1928.
E. I. BRADDOCK
1,690,714
SLIP JOINT
Filed March 28, 1924
2 Sheets-Sheet 1
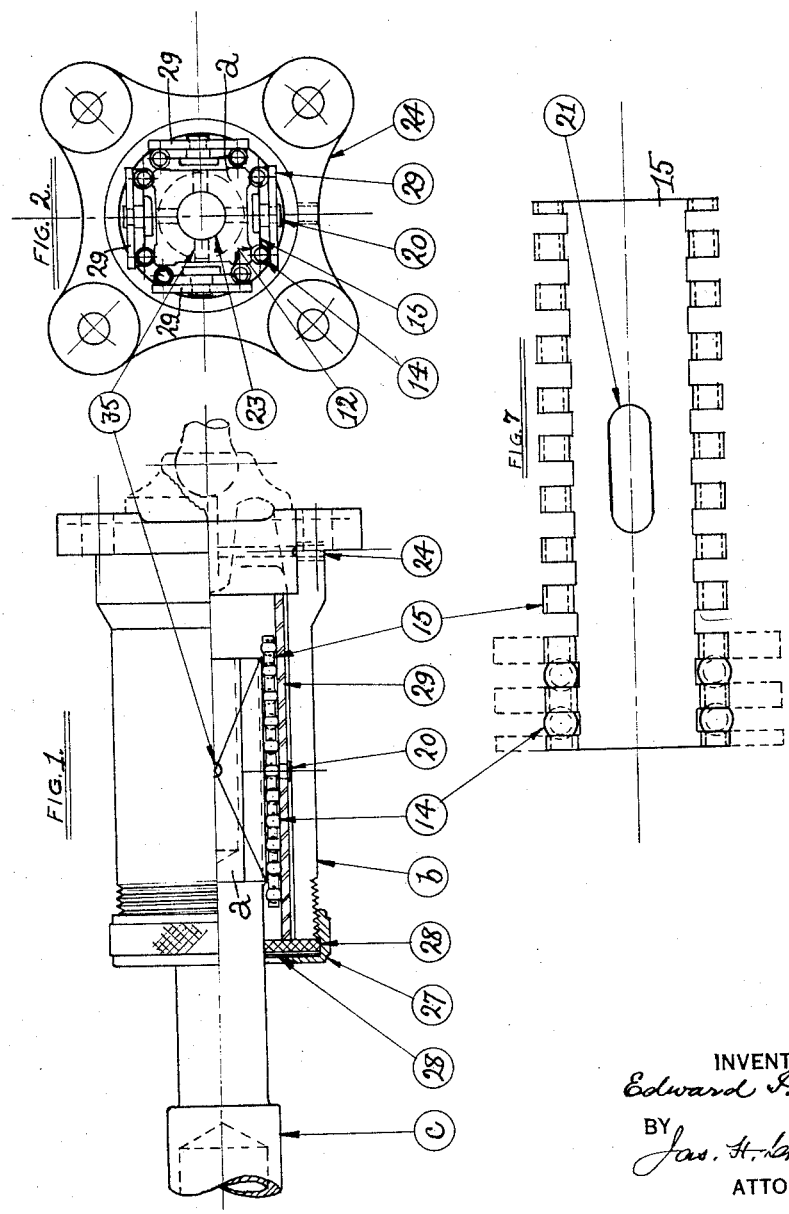
INVENTOR
Edward I. Braddock
BY
Jas. H. Churchill
ATTORNEY

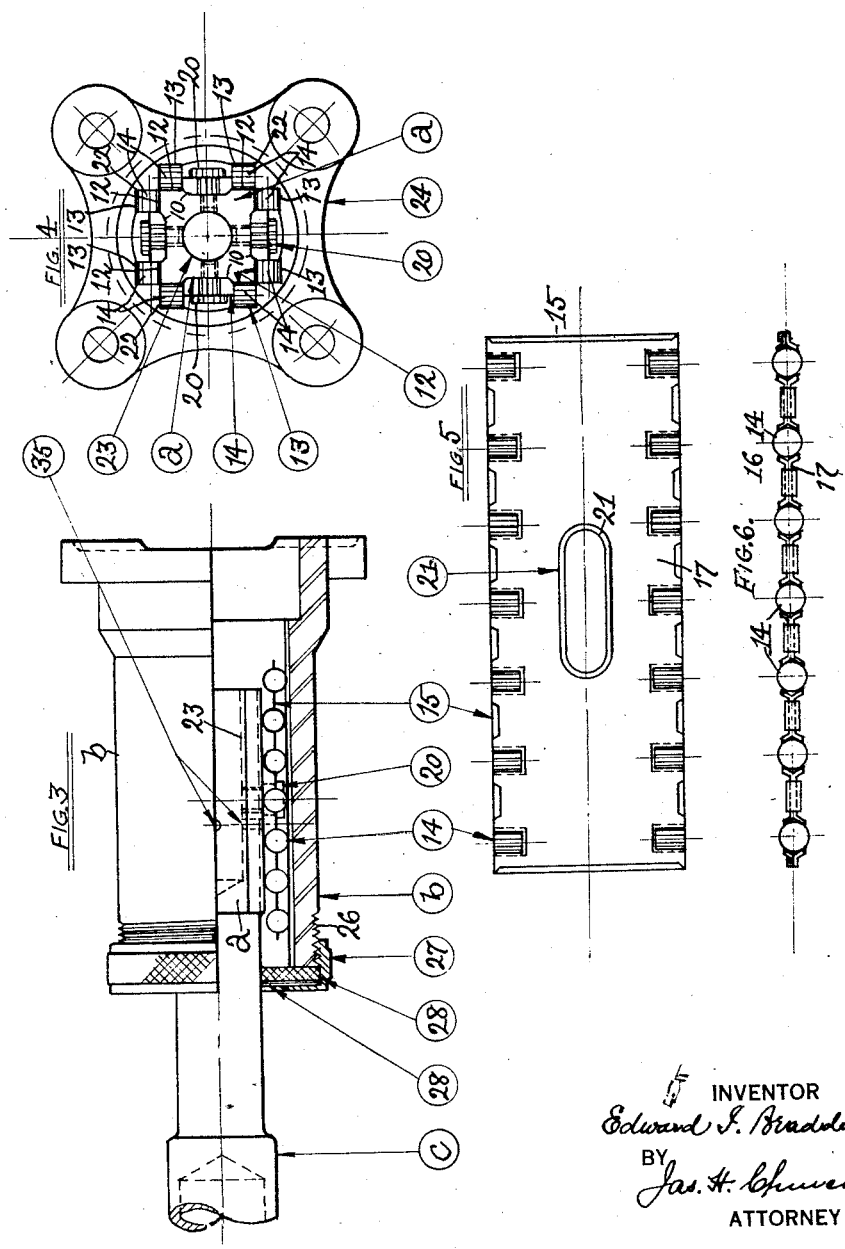

Patented Nov. 6, 1928.

1,690,714

UNITED STATES PATENT OFFICE.

EDWARD I. BRADDOCK, OF CLEVELAND, OHIO; ROBERT H. MONTGOMERY EXECUTOR OF SAID BRADDOCK, DECEASED.

SLIP JOINT.

Application filed March 28, 1924. Serial No. 702,626.

This invention relates to a slip joint having a male and female member movable longitudinally with respect to each other.

The invention has for its object to provide a slip joint of the character described, which is especially adapted among other uses to be employed in automobile and like vehicles for coupling the driving shaft with the driven shaft in such manner as will permit one shaft to be easily moved longitudinally with respect to the other when under load.

To this end, the male member is provided with a plurality of substantially flat wearing surfaces extended longitudinally thereof, and the female member is provided with a plurality of substantially flat wearing surfaces extended longitudinally thereof on its interior and opposing the wearing surfaces of said male member, and said wearing surfaces cooperate with antifriction devices interposed between opposed wearing surfaces. The wearing surfaces may be integral with or separate from the male and female members.

These and other features of this invention will be pointed out in the claims at the end of this specification.

Fig. 1 is a partial elevation and longitudinal section of a slip joint embodying this invention; Fig. 2, an end elevation of the slip joint shown in Fig. 1 looking toward the left; Fig. 3, a partial elevation and longitudinal section of a modification to be referred to; Fig. 4, an end elevation of the joint shown in Fig. 3; Figs. 5 and 6, details of one of the cages shown in Fig. 3; and Fig. 7, a detail of the cage shown in Fig. 1.

Referring to the drawing and especially to Figs. 3 and 4, $a$ represents the male member and $b$ the female member of one form of slip joint embodying the invention. The male member $a$ is represented as a section or extension of a metal shaft $c$ which may be considered the driven shaft, and the female member $b$ is represented as a metal sleeve having provision for attachment to a driving shaft, not shown. The male member $a$ is shown as substantially square in cross-section and each side thereof is provided with a reduced portion 10 between end portions 12 which latter are substantially flat or straight and extend longitudinally of the male member to provide each side with substantially flat or straight bearing or wearing surfaces, which oppose and cooperate with substantially flat or straight bearing or wearing surfaces 13 on the interior of the female member $b$ and extended longitudinally thereof. The bearing surfaces 13 on the female member may be formed by cutting into the inner surface of the sleeve with a suitable cutting tool.

It will thus be seen that a longitudinally extended substantially flat or straight bearing surface 12 on each side of the male member $a$ is opposed to a like bearing surface 13 on the interior surface of the sleeve or female member $b$, and said opposed bearing surfaces are spaced apart a sufficient distance to receive antifriction devices, such as rolls or balls 14 which are carried by a cage or device 15 to keep the rolls or balls in proper relation to the bearing surfaces and in contact therewith. The cage or device 15 may be of any suitable construction capable of holding the rolls or balls and preferably composed of upper and lower sheet metal members 16, 17, detachably secured together and provided with suitable openings through which the rolls or balls project to engage the bearing surfaces.

The cage 15 is movable longitudinally of the male and female members and is guided and limited in such movement by a screw or pin 20 extended through a longitudinal slot 21 in the cage and inserted into a suitable socket in one of the members, which is shown in Figs. 3 and 4 as the male member. The antifriction devices or rolls 14 act also to couple the male and female members together so that rotation of one member will effect rotation of the other member, and in the present instance this is effected by providing the inner circumference of the female member with longitudinally extended recesses 22 whose walls are substantially at right angles to each other.

The male member $a$ may be provided with a bore 23 extended partially the length thereof. The female member $b$ may be provided at one end with a flange 24 by which it may be connected with the driving member therefor, such as the motor shaft of an automobile.

The female member may be provided at its opposite end with screw threads 26 which are engaged by a threaded cap 27 by which discs 28 of felt or other suitable packing material may be held in place to close the end of the sleeve liquid tight.

The female member may be made of chrome steel or like metal which in an unhardened condition is sufficiently hard to afford a durable bearing or wearing surface.

In some instances it may be desirable to make the female member of relatively soft metal, such as aluminum, bronze and the like, on account of lightness and cheapness, in which case the bearing surfaces for the female member are made of separate plates or pieces 29 of a harder material such as unhardened chrome steel or hardened steel after the manner represented in Figs. 1 and 2.

The hard-wearing or bearing members 29 may be inserted into suitable channels in the female member and the cages 15 carrying the balls or rolls 14 are connected with said wearing plates or members by the pins extended through the slots in said cages. The antifriction devices may be lubricated with oil through suitable holes 35 in the female member.

From the above description, it will be seen that by means of the antifriction devices interposed between substantially flat longitudinally extended wearing or bearing surfaces on the male and female members of the joint, the said male and female members when incorporated in a motor vehicle may be moved lengthwise with relation to each other while under load with a minimum amount of power, while at the same time the wearing surfaces may be hardened or made of metal sufficiently hard to stand the wear placed upon them.

What I claim is:—

1. A slip joint comprising a shaft having a male member provided with a plurality of substantially flat longitudinally extended wearing surfaces, a female member co-operating with said male member and having substantially flat wearing surfaces on its interior extended longitudinally thereof and co-operating with the flat wearing surfaces of the male member, and antifriction units insertible into and removable from said female member and interposed between and engaging said opposed wearing surfaces and comprising a plurality of antifriction devices and substantially flat cages by which said antifriction devices are carried and retained in operative relation, said cages comprising members connected together and between which said antifriction devices are located and having openings through which said antifriction devices project.

2. A slip joint comprising a shaft having a male member provided with a plurality of substantially flat longitudinally extended wearing surfaces, a female member co-operating with said male member and comprising a cylindrical sleeve and a plurality of wearing members insertible into and removable from said sleeve and having substantially flat wearing surfaces opposed to the wearing surfaces of said male member, and antifriction units insertible into and removable from said female member and interposed between and engaging said opposed wearing surfaces, and comprising a plurality of antifriction devices and substantially flat cages by which said antifriction devices are carried and retained in operative relation, said cages comprising members connected together and between which said antifriction devices are located and having openings through which said antifriction devices project.

3. A slip joint comprising a shaft having a male member provided with a plurality of substantially flat longitudinally extended wearing surfaces, a female member co-operating with said male member and having substantially flat wearing surfaces on its interior extended longitudinally thereof and co-operating with the flat wearing surfaces of the male member, antifriction devices insertible into and removable from said female member and interposed between opposed wearing surfaces, substantially flat cages in which said antifriction devices are assembled to project therethrough and retained to form a removable antifriction unit, said cages being interposed between said co-operating wearing surfaces and provided with longitudinal slots, and means extended through said slots and secured to one of the members of the slip joint to limit the bodily movement of the antifriction units with relation to the slip joint members.

In testimony whereof, I have signed my name to this specification.

EDWARD I. BRADDOCK.